United States Patent [19]

Kimura et al.

[11] 4,132,824

[45] Jan. 2, 1979

[54] METHOD FOR CASTING ULTRATHIN METHYLPENTENE POLYMER MEMBRANES

[75] Inventors: Shiro G. Kimura, Schenectady; Raymond G. Lavigne, Waterford; Warella R. Browall, Scotia, all of N.Y.

[73] Assignee: General Electric Company, Schenectady, N.Y.

[21] Appl. No.: 817,828

[22] Filed: Jul. 21, 1977

[51] Int. Cl.$^2$ .................. B01D 53/22; B01D 39/16
[52] U.S. Cl. .................. 428/220; 55/158; 260/824 R; 260/827; 428/412; 428/447; 428/516; 428/523
[58] Field of Search .................. 260/827, 824 R; 428/220, 447, 412, 523, 516; 55/158

[56] References Cited

U.S. PATENT DOCUMENTS

| | | | |
|---|---|---|---|
| 3,573,334 | 3/1971 | Wheeler | 260/827 X |
| 3,580,841 | 5/1971 | Cadotte et al. | 210/23 |
| 3,767,737 | 10/1973 | Lundstrom | 264/41 |
| 3,899,309 | 8/1975 | Hoehn | 55/158 X |
| 3,994,988 | 11/1976 | Laurin | 260/824 R |
| 4,028,483 | 6/1977 | Bond et al. | 260/827 X |
| 4,048,129 | 9/1977 | Voight | 260/827 |

OTHER PUBLICATIONS

Manatt, Feasability Study etc., F.AA. Report, 6-1974, Cat. No. AD-784950, NTIS.

*Primary Examiner*—Harold Ansher
*Attorney, Agent, or Firm*—Richard G. Jackson; Joseph T. Cohen; Leo I. MaLossi

[57] ABSTRACT

An improved method is described for solvent casting ultrathin non-porous methylpentene polymer films. The casting solution comprises methylpentene polymer of a mixture thereof with organopolysiloxane-polycarbonate copolymer dissolved in a solvent system and is characterized by being able to spontaneously spread over the surface of the liquid casting substrate. In a preferred embodiment, large-area films less than 200 Angstroms in thickness may be repeatedly formed. The solidified films remain relatively free of tensile stress during formation. The casting solution is deposited in a narrow, longitudinally-extending defined region at the surface of the casting substrate. The surface area and perimeter of the defined region are enlarged over the surface of the casting substrate in a manner whereby the casting solution is moved relative to the casting substrate and, after desolvation, the polymer film formed remains stationary relative to the casting substrate and relatively free of tensile stress. The films are useful as semipermeable membranes for selectively removing oxygen gas from mixtures thereof with nitrogen gas.

8 Claims, 7 Drawing Figures

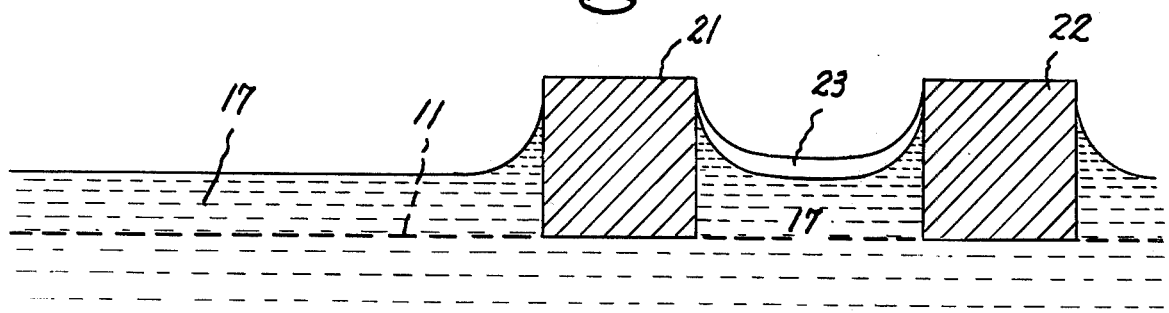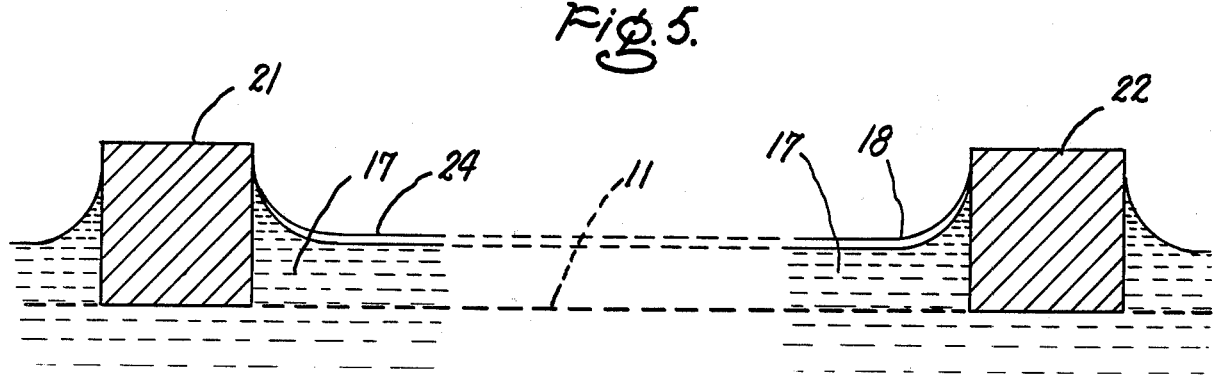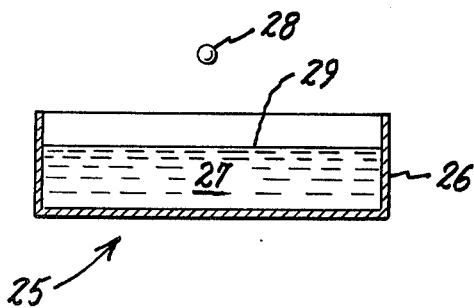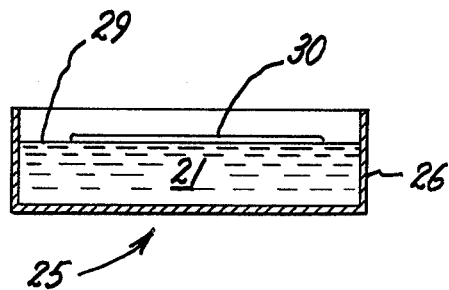

METHOD FOR CASTING ULTRATHIN METHYLPENTENE POLYMER MEMBRANES

This invention relates to preparation of ultrathin films of methylpentene polymeric composition. The films are useful as semipermeable membranes for selectively removing oxygen gas from mixtures thereof with nitrogen gas.

Use of polymethylpentene (PMP) as a hollow-fiber permeable membrane for removing oxygen from air disclosed by Manatt in "Feasibility Study and Demonstration of Nitrogen Generation for Fuel Tank Inerting", a report prepared for the Federal Aviation Administration, dated June 1974, identified as Catalog No. AD-784950, and distributed by the National Technical Information Service, U.S. Department of Commerce, Springfield, Virginia. Fiber walls 6 to 7 microns in thickness are reported.

Methods employing liquid casting substrates for preparing thin semipermeable membranes of a variety of polymeric materials are known in the art. In U.S. Pat. No. 3,580,841, Cadotte et al., a method is described wherein polysaccharide polymer solution is poured upon a liquid surface and is permitted to desolvate leaving a polymer membrane 500 to 5000 Angstroms in thickness. In U.S. Pat. No. 3,767,737, Lundstrom teaches preparation of ultrathin polymer membranes by continuously transferring a polymer-containing casting solution upwardly through a floating support liquid for deposition on the upper surface thereof. As described therein, a particularly useful polymer includes alternating blocks of repeating units comprising bisphenol-A carbonate units and dimethylsiloxane units. The thickness of membrane prepared by the Lundstrom method is given as between about 0.005 mil (1300 Å) and 0.05 mil (13,000 Å). Pate and Yaffe in the article, "A Material and Techniques for the Fabrication and Measurement of Very Thin Films for Use In 4 $\pi$- counting", Canad. J. Chem. 33, 15 (1955), describe liquid substrate casting of polyvinylchloride-acetate copolymer resin from a solution thereof in cyclohexanone. A barrier and solidified edge of film were moved over a water surface.

A substantial improvement over the foregoing casting methods is described by Ward in U.S. Pat. application Ser. No. 536,650, filed Dec. 26, 1974, assigned to the assignee hereof, and incorporated herein by reference. As described therein, ultrathin polymeric membranes substantially free of tensile stress and having surface areas of greater than one square foot may be prepared. Relative movement of barrier rods is employed to enlarge a liquid substrate area over which a spontaneously spreadable casting solution moves while the solid polymer film remains stationary.

However, the art is still in need of a reliable reproducible method for forming ultrathin membranes comprising MPP, especially such membranes having large areas (e.g. greater than 0.4 square foot) for use in commercially attractive devices, e.g. for gas separation. Prior attempts by others were unsuccessful for casting films of methylpentene polymer (MPP) from solutions thereof onto liquid substrates, typically resulting in non-spreading gel-like globs.

Unexpectedly, it has now been found by practice of the present invention that MPP polymeric compositions, desirably further including an organopolysiloxane-polycarbonate (PSPC) copolymer, can be dissolved to form casting solutions which spontaneously spread over liquid substrates to form ultrathin MPP-containing films. After desolvation, the resulting ultrathin solid films are generally found to be substantially defect-free, have substantial resistance to flux decay, and exhibit high permeability to $O_2$ gas and high selectivity for $O_2$ gas relative to $N_2$ gas. It has also unexpectedly been found that large area ultrathin films comprising MPP can be made employing the method described in the above-cited application Ser. No. 536,650.

DESCRIPTION OF THE INVENTION

Generally stated, in one aspect, this invention provides a process of casting a thin solid film of an MPP-containing polymeric composition. A quantity of a casting solution comprising a suitable solvent system and dissolved therein per 100 parts of MPP from 0 to about 100 or more parts of a PSPC copolymer is deposited onto the surface of a liquid casting substrate. The solvent system is selected such that the solution is able to spontaneously spread over the substrate. The deposited solution is allowed to both spontaneously spread over the substrate and desolvate to effect formation of the thin solid film.

In the Ward application Ser. No. 536,650, an improved method is described for the solvent casting of ultrathin non-porous membranes having surface areas of greater than one square foot. Film thicknesses of less than 200 Angstroms are routinely obtained. The solidified film remains substantially free of tensile stress during the formation and, if properly handled, during removal thereof from the liquid casting substrate. The casting solution used comprises polymer dissolved in a solvent system and is characterized by being able to spontaneously spread over the surface of the liquid casting substrate. The casting solution is deposited in a narrow, longitudinally-extending defined region at the surface of the casting substrate. The surface area and perimeter of the defined region are enlarged over the surface of the casting substrate in a manner whereby only casting solution is moved relative to the casting substrate and, after desolvation, the polymer film formed remains stationary relative to the casting substrate and substantially free of tensile stress.

Generally stated, this invention further provides a significant improvement over the Ward casting method. The improvement includes employing a suitable casting solution wherein the dissolved polymer comprises, per 100 parts MPP, from zero to about 100 or more parts of a PSPC interpolymer.

BRIEF DESCRIPTION OF THE DRAWING

This invention will be better understood from the following detailed description taken with the accompanying drawing in which:

FIG. 4 is a view similar to FIG. 2 showing the interrelationship, when the contact surfaces of the barrier rods are hydrophilic;

FIG. 5 is a view similar to FIG. 3 reflecting the arrangement of FIG. 4;

FIG. 6 is a sectional elevation view illustrating another apparatus useful herein and a drop of an MPP containing casting solution above the liquid substrate; and FIG. 7 is a view similar to FIG. 6, illustrating a thin film formed from the drop.

Figure 1:
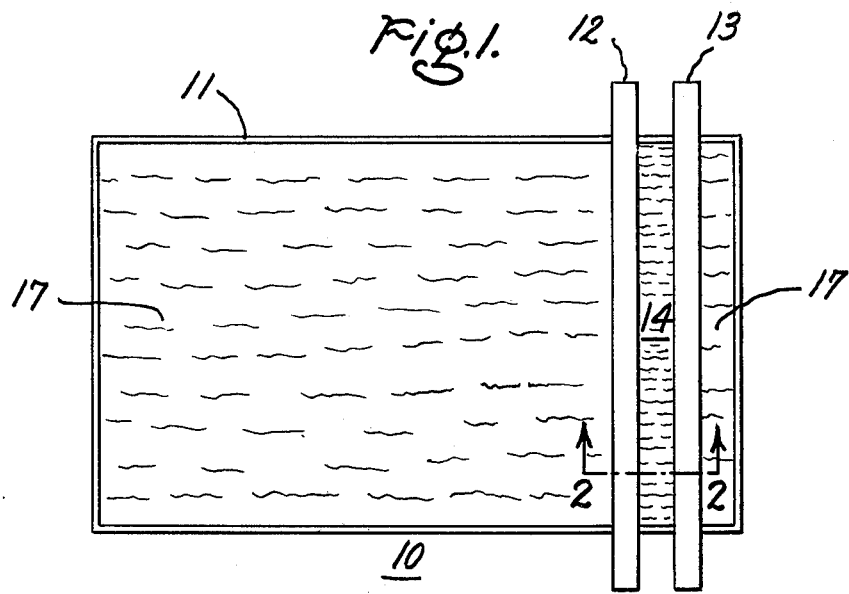
FIG. 1 is a plan view schematically illustrating apparatus suitable for practicing a preferred embodiment of this invention.

DETAILED DESCRIPTION OF THE INVENTION AND MANNER AND PROCESS OF MAKING AND USING IT

Film-forming MPP-containing compositions suitable for use in the practice of this invention include, in general, any methylpentene homopolymer (PMP) or interpolymer of methylpentene with one or more other monomers interpolymerizable therewith, including graft and block interpolymers and the like, capable of formation into substantially hole-free films by solvent casting. Blends of any of the foregoing with up to about 100 or more parts, preferably from 1 to about 25 parts, per 100 parts of the MPP-containing polymer, of one or more PSPC interpolymers are generally preferred. Preferably, the MPP polymer composition included as part of the casting system employed in this invention is not soluble in the film-support liquid; is not highly swollen by the film-support liquid; and is soluble in a normally liquid solvent.

The preferred MPP composition herein is a 4-methylpentene-1 homopolymer having a weight average molecular weight ($\bar{M}_W$) of about 140,000 and commercially available from Mitsui, Inc. of Tokyo, Japan, under the trademark TPX, grade RT-20.

PSPC interpolymers suitable for use in MPP-containing blends in the practice of this invention include repeating units desirably comprising bisphenol-A carbonate (BAC) units and dimethylsiloxane (DMS) units, preferably wherein the BAC and DMS units are present in blocks. Block interpolymers of BAC and DMS and methods for the preparation thereof are described in U.S. Pat. No. 3,189,662-Vaughn, Jr., (incorporated herein by reference). The BAC-DMS interpolymers may be alternating, random block polymers of the -ABABA- type in which the blocks are polydisperse. Such interpolymers may be represented by the formula below and may include other interpolymerized monomer units (not shown):

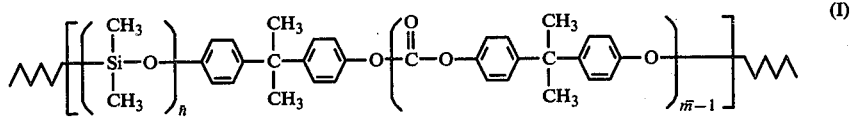

Additional teachings are provided in U.S. Pat. No. 3,419,634 - Vaughn and U.S. Pat. No. 3,419,635 - Vaughn on the preparation of silicone/polycarbonate copolymers.

The PSPC interpolymer $\bar{M}_w$ may be in the range from about 15,000 to about 150,000, $\bar{n}$ and $\bar{m}$ being numbers selected to accommodate these values for the interpolymer of formula I.

The solvent for the casting solution may be selected from normally liquid hydrocarbon organic compounds having, e.g., from one to ten carbon atoms, and such compounds containing, e.g., halogen, nitrogen, oxygen or sulfur atoms and mixtures of the foregoing atoms and compounds. The solvent for any selected polymer casting system preferably is immiscible with the support liquid used and preferably has a normal boiling point of at least about 80° C.

The solvent selected preferably dissolves the polymer material in moderately high concentration, e.g., about 1-7% by weight.

The casting solution is able to spread spontaneously over the casting substrate surface available thereto during conduct of the process. Solutions described herein are so characterized when the liquid of the casting substrate is water.

Desirably, the casting solution is deposited at a solution temperature in the range of slightly more than $T_1$ to about $T_2$ where $T_1$ is no less than the lowest temperature at which substantially all the polymer present in the solvent system is soluble therein (i.e., dissolved therein at equilibrium conditions). $T_2$ is the lesser of (a) about 90° C. and (b) the temperature at which the vapor pressure of said solution is equal to the pressure at the surface of said substrate. $T_1$ is less than $T_2$. Surprisingly, the casting substrate may be at a temperature of less than $T_1$, at which condition those of ordinary skill in the art would expect gellation, rather than spreading of the solution. Atmospheric pressure is preferred.

In a preferred embodiment, the solvent system suitably includes trichloroethylene, tetrachloroethylene, 1,2,3-trichloropropane, chloroform, methylene chloride, mixtures thereof or the like. The solution is deposited at a temperature in the range of slightly more than $T_1$ to about $T_2$ (as defined above), e.g., from about 50° C. to about 90° C., preferably from about 73° C. to about 77° C. The casting substrate is at a temperature of from about 20° C. to about 60° C., preferably from about 50° C. to about 60° C., and the liquid thereof is water. The solvent system is present in an amount of from about 93 to about 99% by weight of the solution in this embodiment.

The preferred solvent system for both MPP and mixtures of MPP with PSPC copolymer is a mixture of equal volumes of 1,2,3-trichloropropane (TCP) and trichloroethylene.

The preferred film-support liquid is water, preferably free of surfactants. However, mercury and various low melting alloys as described in U.S. Pat. No. 3,445,321 — Groves (incorporated by reference) may also be employed as the liquid substrate.

Referring now to FIG. 6, apparatus 25 includes container 26 containing bath 27 of a suitable liquid, e.g., water, which is preferably substantially free of particulates and other contaminants, to serve as a liquid casting substrate in carrying out the present process. Drop 28 of a spontaneously spreadable casting solution containing a suitable solvent and dissolved therein MPP or a blend of MPP and PSPC interpolymer, as described above, is shown being deposited onto surface 29 of the bath. The surface is preferably still and flat. Deposition of the casting solution may be made using any suitable means therefor, e.g., a hypodermic needle, pipette or the like, held sufficiently close to the substrate surface, e.g., about 2-5 millimeters thereabove, such that the substrate is relatively undisturbed by deposition of the solution.

Surprisingly, the substrate can be at a temperature below $T_1$ of the casting solution, which is deposited while at a temperature preferably in the range from slightly above $T_1$ to about $T_2$. For example, the liquid substrate may be water at a temperature of about 20° to 25° C., and the casting solution may be a 1 to 7 percent solution of PMP in trichloroethylene at a temperature of 1-2 degrees C. above $T_1$ (about 50-55° C.). Spreading of the deposited solution occurs spontaneously with substantially no solution gellation or lens formation. After desolvation (evaporation of the solvent), the resulting ultrathin solid PMP film 30 (FIG. 7) may be recovered. Although the process may effectively be carried out where the temperature of the casting substrate is less than $T_1$, thinner, larger area films may be more readily prepared from a given volume of solution by employing a liquid bath at higher temperatures, e.g., $T_1$ or more.

Figure 2:
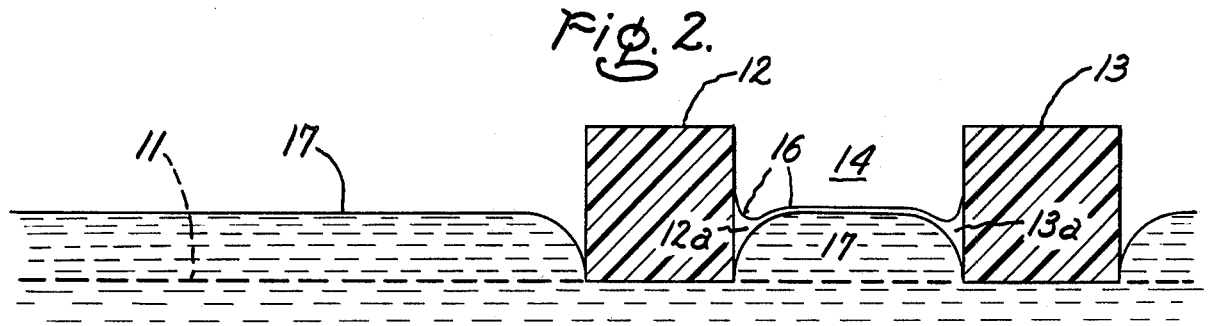
FIG. 2 is an enlarged view taken on line 2—2 of FIG. 1 showing the interrelationship between the initial concentration of polymer casting solution, the surface of a water-casting substrate and the barrier rods, when the contact surfaces of the barrier rods are hydrophobic.
Figure 3:
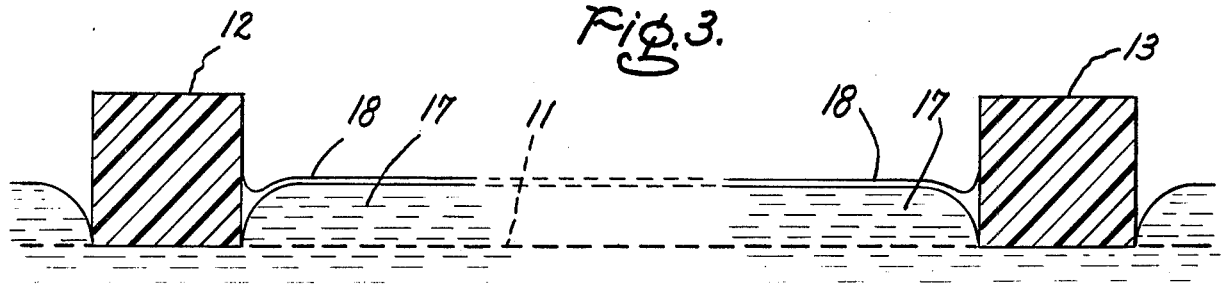
FIG. 3 is a schematic view similar to FIG. 2 showing the desolvated film.

Solid ultrathin MPP or MPP-PSPC interpolymer films larger than about 10 square inches in area can best be made using the embodiment of this invention illustrated in FIGS. 1-3 as next described. However, either the foregoing or the following process may be employed to prepare thin solid films of this invention which comprise MPP and from 0 to about 100 or more parts (preferably 1 to about 25 parts) of a PSPC interpolymer per 100 parts of MPP, which may be substantially uniform in thickness of less than about 300 Angstroms, e.g., about 200 Angstroms or less, and have substantial resistance to flux decay. The films including from 0 to about 100 parts of PSPC interpolymer are characterized with an $O_2/N_2$ separation factor, $\alpha(O_2/N_2)$, of at least 2.3 while the preferred films (containing 1 to about 25 parts of PSPC interpolymer) are characterized with an $\alpha(O_2/N_2)$ of at least 4.0. Similarly characterized single-layer MPP-containing films greater than 300 Angstroms, e.g., up to about 500 or 1000 Angstroms (0.1 micron) or more, may also be prepared by practice of this invention. As used herein, flux decay means a decrease in the permeability of a membrane to one or more gases, e.g., $O_2$, $N_2$, and the like, over a period of time. A number of known polymeric membranes which may otherwise be commercially attractive for separating oxygen gas from nitrogen gas are not entirely satisfactory from the standpoint of resistance to flux decay.

Referring to FIG. 1, apparatus 10 useful in the improvement aspect of this invention includes tray 11 and barrier rods 12, 13. In the preferred construction tray 11 is coated with a material to render the surface (at least the edges) thereof hydrophobic, e.g., a coating of polytetrafluoroethylene. The tray dimensions may be 80 cm × 35 cm, but a tray having larger dimensions, particularly in the direction of the barrier rods, may be employed. In the arrangement shown in FIGS. 2 and 3, barrier rods 12, 13 (¼" square) are coated with polytetrafluoroethylene. In the arrangement shown in FIGS. 4 and 5, the barriers employed are clean ¼" square brass rods (hydrophilic rods). Barrier rods having hydrophobic coatings have been found operable and are preferred herein. However, rods having hydrophilic coatings are also contemplated.

Tray 11 is filled to slightly above the rim thereof with water relatively free of surfactants and particulates and barriers 12, 13 are swept over the liquid surface to insure the removal of contaminants floating on the surface of the water. In the arrangement shown, barriers 12, 13 are rested on the rim of tray 11 adjacent one end thereof, spaced apart approximately 1 cm to define together with the edges of tray 11 a region (depository 14) to receive the spontaneously spreadable casting solution as described in greater detail hereinbelow. When casting solution 16 is carefully introduced (e.g., drop by drop) into the depository 14 defined by hydrophobic surfaces, this solution 16 floats on the water 17, enters the wells 12a and 13a created by the convex meniscus of the water between the barriers and wets the barriers (FIG. 2). If depository 14 is defined by hydrophilic surfaces (brass barrier rods 21, 22 in FIG. 4), the solution 23 will rest in the well formed by the concave meniscus wetting the barriers as shown.

Care is taken not to overload depository 14. If too much casting solution is introduced into depository 14, the casting solution will leak on the far ends of the well. The amount of casting solution that can be added without overloading is not critical. For blends of MPP and PSPC interpolymers, for example, as much as three times the volume calculated for film formation may be added before spillage occurs. The total volume of solution introduced into depository 14 depends upon the concentration of polymer solution and the area and thickness of the desired film with the provision, of course, that the depository should not be overloaded. A convenient way in which to introduce the casting solution is by the use of hypodermic syringe or dropper. This method offers excellent control on the deposition whereby the maximum acceptable volume of casting solution may be readily determined.

Thereafter, barrier rod 12 is drawn away from (but remains substantially parallel to) barrier 13 toward the opposite end of tray 11. This action results in a controlled enlargement of both (a) the surface area to which the deposited casting solution can spontaneously spread and (b) the perimeter bounding this expanding surface area.

Since various combinations of rate of barrier separation and volatility of the solvent system may be employed, either the full extent of the casting area may be reached before film solidification is initiated or solid film may begin to form shortly after enlargement of the surface area and perimeter of the defined region has begun. However, as the barrier separation occurs in each case, there is movement of the casting solution contained within the solution well alone relative to the casting substrate and the polymer film formed remains stationary relative to the casting substrate throughout the casting operation. Because of the controlled enlargement of area and perimeter described above, the casting solution has no opportunity to create an uncontrolled, fast-moving, fast desolvating monomolecular film ahead of the advancing front.

Conceptually, in those cases in which the interrelationship of the time required to reach the full extent of the desired casting area and the casting solution solvent volatility is such that no solid film is formed before the barrier separation has been completed, the casting solution spread may be best considered as merely a thinning of the bulk liquid initially disposed in depository 14 followed by desolvation of the whole area of cast liquid at the same time. Hereinafter this mode of operation will be referred to as the "thinning mode."

On the other hand, when the interrelationship of the rate of barrier separation and solvent volatility is such that solid film begins to form shortly after barrier movement has been initiated, as the barrier is moved, the well (or reservoir) of casting solution adjacent thereto moves along with it. As new surface area is made available by the barrier movement, casting solution moves up out of this moving reservoir to spontaneously spread over the new area and, thereby, distribute polymer, which remains to form the film after the solvent has evaporated. At the same time previously spread casting solution desolvates to yield a solid film. This is the preferred mode of operation of this invention and hereinafter will be referred to as the "incremental solidification mode".

This newly spread casting solution manifests itself as a colored fringe that extends along the barrier and moves with it. Viewing the colored fringe and the adjacent solidified polymer film, the film appears greyish and, proceeding in the direction of the moving barrier, successive bands of silver, yellow, red and blue may be seen. This colored fringe (in which the color sequence may repeat) appears only along moving barriers, when operating in the differential solidification mode.

The width of the colored fringe is a simple routine test to ascertain the efficacy of a given casting solution solvent. If the width of the colored fringe is less than about 55 mm (e.g., 5–50 mm) at the desired rate of barrier separation, the casting solution has been optimally selected and the desolvation is proceeding in the preferred manner. If the width of the colored fringe extends much beyond 50 mm (e.g., 75–100 mm), a compatible solvent that is more volatile preferably is added to the casting solution to reduce the desolvation time.

An important result of having the casting solution spread only from moving reservoirs adjacent moving barriers during increase in surface area/perimeter from defined regions, when operating in the incremental solidification mode, is that the only relative movement occurring between polymer molecules and the casting substrate occurs when the polymer is in the dissolved or liquid phase. Desolvated solid polymer film remains stationary on the liquid casting substrate and is at least relatively free of tensile stress. Thereafter, as is described hereinbelow, after completion of barrier separation and the last of the desolvation, all or a desired portion of the solidified film is removed from the casting substrate in a gentle manner (described hereinbelow) so that relative freedom from tensile stress is preserved. During desolvation slight shrinkage (e.g. up to about 10%) in the forming film may occur.

By the use of this method, non-porous ultrathin (1000 Å or less) MPP-containing films with surface areas greater than 0.4 square foot may be repeatedly produced using siliconepolycarbonate additive. Such films are preferred and, in some instances required, for commercially attractive membranes for gas separation applications.

Although barriers wet by the casting substrate (FIGS. 4 and 5) may be used in carrying out the same manipulative steps, the use of barriers that are not wet by the casting substrate is much preferred.

If desired the water level need not project above the edges of the tray, but in such an arrangement, the barrier rods must have a configuration whereby they recess into the tray for the same placement relative to the liquid surface (setting in the liquid deeper than the meniscus) in order to be effective. The cross-sectional shape of the barrier rods does not appear to be critical.

Regardless of the mode of operation, the resulting fully desolvated film appears clear and black and/or light gray (films less than about 1000 Å) in color, having passed through a series of color changes ranging from violet, blue, red, yellow and silver. Loss of color (becoming black or gray) occurs once the thickness of the film has been reduced to a point at which interference patterns are no longer produced in the film by reflected white light.

After a pool of film-forming solution has been placed in the defined region between the barriers, separation of the barriers effects formation of film 18 (or film 24), the casting are being bounded at its perimeter by the barriers and the sides of tray 11. This separation or movement may be accomplished manually or mechanically. At least one barrier member is moved in order to enlarge the defined region. However, obvious extensions of this general teaching are encompassed within this invention. For example, first one barrier and then the other can be moved, rates of barrier movement may be varied, etc.

The maximum rate of movement may be readily determined of the casting solution employed. Slow movement of the barrier is preferred for minimizing turbulence in the casting substrate. Barrier movement is too rapid if the polymer casting solution is unable to remain adjacent thereto. The maximum rate of separation of the barrier rods is preferably about 12 inches per minute for the preferred polymer casting solutions.

Removal of the film from the surface of the casting substrate in a manner substantially free from tensile stress is best accomplished by the use of vacuum-pickup on a microporous surface designed to serve as the substrate for the film or laminations thereof. Apparatus for the film pickup (not shown) in its simplest form consists of a closed chamber having one porous wall (e.g., sintered metal particles) at least the size of the area of film to be recovered. A vacuum is drawn on the chamber after the porous wall has been covered with a layer of microporous substrate (e.g., Celgard ® microporous polypropylene - Celanese Plastics Company; Millipore ® ultrafiltration membrane; Selectron membrane filter; and, preferably, microporous Lexan ® polycarbonate) and the substrate is brought into contact with the desolvated film. In this way 80% or more of the solidified ultrathin film can be recovered. Subsequent layers of film may be picked up in the same manner with each new layer sticking to the earlier deposited one. Bubbles of gas entrapped between layers may be gradually withdrawn by permeation and the film adjusts itself shrinking as the gas leaves.

Substantially hole-free single-layer MPP-containing films having surface areas of up to 42" × 77" or more may be made by the barrier method of this invention. A film is "hole-free," if when it is checked for the permeation of two separate gases (e.g., oxygen, nitrogen) therethrough, it is found to have a separation factor (e.g, the ratio of oxygen permeability to nitrogen permeability) at least as great as that for the bulk material of which the film is made.

The prime advantage of being able to make substantially hole-free thin films is that a composite essentially hole-free multi-layer film can be made therefrom since it is highly unlikely that any hole in one layer will line up with a hole in another layer. When two or more such MPP-containing films are placed in surface-to-surface contact, they become unified. These laminated films appear to have about 30 percent less variation in thickness than occurs in a single layer film as cast.

Preferably, no attempt is made to move or stretch the solid film. In general, ultrathin MPP-containing films of less than 100–200 Angstroms do not survive such treatment. The control over the advancing reservoir of casting solution is active (by the use of the barrier), however, the spreading of the casting solution to newly available area on the casting substrate is spontaneous and is dependent on the surface-active properties of the solution.

Practice of the present invention is further illustrated by the following non-limiting examples. Throughout this description and in the claims which follow, all parts, ratios, percentages and the like given are by weight unless indicated otherwise. (Separation factors are based on volumetric permeabilities).

EXAMPLE 1

A substantially hole-free PMP film, circular and about 3 inches in diameter, was prepared by depositing a drop (about 0.005 cc) of trichlorethylene solution containing about 2 grams (per 100 cc) of TPX, grade RT-20, PMP onto the surface of a bath of distilled water contained in a 4" (4-inch) diameter petri dish. For this solution $T_1$ is about 50° C. and $T_2$ is about 87° C. The solution was deposited at about 72° C. from a hypodermic needle held 2–3 mm above the water surface which was at room temperature (about 25° C.) and 14.7 psia. The drop quickly and spontaneously spread over the water surface, desolvated and formed a solid film about 160 Angstroms in thickness. The above procedure was repeated four times. Each film was successively picked up after formation thereof using a porous Lexan ® (trademark of General Electric Company) polycarbonate membrane having a vacuum applied through the pores thereof, resulting in a composite membrane of 5 PMP layers in surface-to-surface contact and supported on the polycarbonate membrane.

The composite membrane was tested in a vacuum permeation test system wherein one side of the PMP composite was supplied with oxygen gas at 23° C. and about 1 atmosphere pressure. The pressure differential ($\Delta P$) developed across the multi-layer membrane was 12.6 cmHg and the available surface area thereof was 3.88 cm². The permeability to $O_2$ (Pr-$O_2$) of PMP given by the supplier is $2.6 \times 10^{-9}$ $$\frac{cc(STP) \times cm \text{ (thickness of membrane)}}{second \times cm^2 \text{ (membrane area)} \times cm\ Hg(\Delta P)}.$$

By dividing the Pr-$O_2$ by the observed permeation rate for $O_2$ (4.08 cc(STP)/sec. cm₂, when converted to standard temperature and pressure) and multiplying the result by the above $\Delta P$, the effective thickness of the 5-layer PMP composite was calculated as about 803 Angstroms. Thus the average PMP layer thickness was about 160 Angstroms as described above. Pr-$N_2$ was found to be $0.63 \times 10^{-9}$ in the above units. The separation factor, $\alpha$(Pr-$O_2$:Pr-$N_2$), was calculated as 4.1 from these permeabilities. Each PMP layer was substantially uniform in thickness throughout and is expected to have substantial resistance to flux decay in $O_2/N_2$ separation service. The PMP-composite was substantially free of through-pinholes and other defects.

EXAMPLE 2

A membrane was cast from a solution of 1.3 g. solids per 100cc, the solids composition being 79% PMP (TPX, grade (RT-20) and 21% PSPC (57% SiO(CH$_3$)$_2$; SiO(CH$_3$)$_2$ units per block) copolymer. The solvent used was tetrachloroethylene. The solution was prepared by admixing the above ingredients at a temperature of about 70° C. $T_1$ is about 50° C; $T_2$ is 90° C.

About 0.05 cc of this casting solution was introduced at 70° C. as droplets in, and distributed itself along, the long narrow (about 1/16" wide) region defined between a pair of PTFE-coated barriers in the apparatus illustrated in FIGS. 1–3. The barriers extended over the edges of a water-filled tray 6" wide and in contact with the surface of this casting substrate at 52° C. and 14.7 psia. One of the barriers was moved manually away from the other (keeping reasonably parallel thereto) at a speed of about 1 foot per minute. A fringe of colors adjacent to the moving barrier moved therewith during the enlargement of the casting area by barrier movement. The film was about 3" $\times$ 6" after slight shrinkage during desolvation.

After making the film (150–200 Angstroms in thickness), a portion thereof was picked up by gently placing thereon a layer of saran having a ¼-inch diameter through-hole and lifting the resulting film-saran composite. The film did not break during pick-up, thus evidencing surprisingly high film strength.

EXAMPLE 3

A number of relatively large area PMP-PSPC membranes were prepared substantially as described in Example 2, except as follows. For preparation of each membrane about 0.04 cc of casting solution at 75° C. was deposited onto a clean surface of water at 56°–60° C. (as measured an inch below the surface). The casting solution concentration was 1.5 g/100 cc. The amount of PSPC (recrystallized and 112,000 $\overline{M}_w$) was 25 parts per 100 parts of the PMP (also recrystallized). The barrier separation speed was about 4.8 feet per minute. After desolvation, each resulting membrane was about 387 cm² (about 0.45 ft²) in area and substantially uniform in thickness of about 200–225 Angstroms.

Eight PPM-PSPC membranes of this example were picked up in succession on a porous polycarbonate support membrane as in Example 1 to form a composite membrane. The separation factor, $\alpha(O_2/N_2)$, was 4.05 as calculated from the Pr-$O_2$ and Pr-$N_2$ values determined for this composite. The $\alpha(O_2/N_2)$ for a similarly prepared 20-layer PPM-PSPC porous polycarbonate composite was 4.06.

EXAMPLE 4

PMP-PSPC membranes prepared in Example 3 were tested for resistance to flux decay in oxygen-enrichment-of-air service. A composite was prepared on one PMP-PSPC layer supported on a porous polycarbonate support with an ultrathin outer membrane of PSPC over the PMP-PSPC layer. The polycarbonate side of the composite was in contact with the non-woven polyester mat portion of a screen laminate including two layers of coarse polyester screens thereunder, the screens being supported on an aluminum plate. Air was continuously blown at a high rate at room temperature and about 1 atmosphere over the outer membrane of the composite and vacuum was continuously applied to the screen laminate side of the structure. The PSPC layer was employed as a sealant layer as described in Browall, U.S. Pat. No. 3,980,456.

The high concentration of $O_2$ in the gaseous mixture ($O_2$-encirched air) being withdrawn through the screen laminate remained substantially constant throughout the 45-day test for any given level of vacuum employed.

For example, at a vacuum-side absolute pressure of about 0.1 atmosphere the enriched air contained about 43% $O_2$ throughout the test. High flow rates of enriched air (e.g. about 1cc/sec) were obtained. This example illustrates that the ultrathin PMP-PSPC membranes of this invention have substantial resistance to flux decay and are capable of high throughput rates.

PSPC copolymer may be added to PMP as a casting aid in an amount up to about 25 parts PSPC per 100 parts PPM, without reducing the $O_2/N_2$ separation factor below 4.0 (a value not significantly less than the separation factor for PMP.)

The films (single or laminated) of this invention mounted on a microporous substrate find use in gas separation devices. The economics of oxygen enrichment (over 30% $O_2$) of air by membrane separation become favorable with the availability of ultrathin MPP polymer films. Having the capability for making such films very thin (e.g., less than 200 Å) and defect-free is most important to this economic viability in order to attain, sufficient rates of $O_2$ throughput. Thus, this invention makes available to the art in an MPP-containing membrane the combination of throughput, high $O_2/N_2$ separation, and good resistance to flux decay.

Preparation of porous polycarbonate membranes such as that employed in Example 1 above is described in U.S. patent application Ser. No. 456,970 (Salemme), filed Apr. 1, 1974, assigned to the assignee hereof and incorporated herein by reference.

BEST MODE CONTEMPLATED

The best mode contemplated for carrying out this invention has been set forth in the description above, for example, by way of setting forth preferred film compositions and operating conditions, including but not limited to preferred ranges and values of amounts, temperatures, pressures, and other unobvious variables material to successfully practicing (including making and using) the invention in the best way contemplated at the time of executing this patent application. In preparing casting solutions, the preferred solvents are heated to at least their respective $T_1$'s to effect dissolution of the MPP or MPP-PSPC mixture employed.

It is understood that the foregoing detailed description is given merely by way of illustration and that many modifications may be made therein without departing from the spirit or scope of the present invention.

What is claimed is:

1. An ultrathin film of polymeric composition comprising blend of a methylpentene polymer and an organopolysiloxane-polycarbonate interpolymer, said interpolymer being present in an amount of up to about 100 parts by weight per 100 parts by weight of said methylpentene polymer, said film characterized with an $O_2/N_2$ separation factor having a value of at least 2.3, substantially uniform thickness of less than about 1000 Angstroms, and substantial resistance to flux decay.

2. The ultrathin film of claim 1 wherein said thickness is less than about 500 Angstroms.

3. The ultrathin film of claim 1 wherein said thickness is less than about 300 Angstroms.

4. The ultrathin film of claim 1 wherein the organopolysiloxane-polycarbonate interpolymer is present in an amount of from about 1 to about 25 parts by weight and the $O_2/N_2$ separation factor is at least 4.0.

5. The ultrathin film of claim 4 wherein the area of the film is greater than 0.4 square foot.

6. The ultrathin membrane of claim 4, wherein the polymer is polymethylpentene and the interpolymer includes repeating units comprising bisphenol-A carbonate (BAC) units and dimethylsiloxane (DMS) units, said BAC and DMS units being present in blocks.

7. The ultrathin film of claim 1 wherein said polymer is a polymer of 4-methyl-pentene-1.

8. The ultrathin film of claim 7 wherein said polymer is a homopolymer of 4-methyl-pentene-1.

* * * * *